United States Patent
Kojima et al.

(10) Patent No.: US 9,330,805 B2
(45) Date of Patent: May 3, 2016

(54) LITHIUM SILICATE-BASED COMPOUND, POSITIVE ELECTRODE ACTIVE MATERIAL FOR LITHIUM ION SECONDARY BATTERY, AND LITHIUM ION SECONDARY BATTERY USING THE SAME

(75) Inventors: Akira Kojima, Kariya (JP); Toshikatsu Kojima, Ikeda (JP); Mitsuharu Tabuchi, Ikeda (JP); Tetsuo Sakai, Ikeda (JP); Masanori Morishita, Ikeda (JP); Takuhiro Miyuki, Ikeda (JP); Junichi Niwa, Kariya (JP); Masataka Nakanishi, Kariya (JP); Yuya Sato, Kariya (JP); Kazuhito Kawasumi, Kariya (JP); Masakazu Murase, Kariya (JP)

(73) Assignees: KABUSHIKI KAISHA TOYOTA JIDOSHOKKI, Aichi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/351,714
(22) PCT Filed: Jul. 26, 2012
(86) PCT No.: PCT/JP2012/004768
  § 371 (c)(1),
  (2), (4) Date: Apr. 14, 2014
(87) PCT Pub. No.: WO2013/054457
  PCT Pub. Date: Apr. 18, 2013

(65) Prior Publication Data
  US 2014/0231721 A1    Aug. 21, 2014

(30) Foreign Application Priority Data
  Oct. 14, 2011    (JP) .................................. 2011-226737

(51) Int. Cl.
  *H01B 1/06* (2006.01)
  *C01B 33/20* (2006.01)
  (Continued)

(52) U.S. Cl.
  CPC ........ *H01B 1/06* (2013.01); *C01B 33/20* (2013.01); *C01B 33/32* (2013.01); *H01M 4/5825* (2013.01);
  (Continued)

(58) Field of Classification Search
  CPC .......... C01B 33/20; C01B 33/32; H01B 1/06; H01M 4/5826; H01M 4/625
  See application file for complete search history.

(56) References Cited

U.S. PATENT DOCUMENTS

| | | | |
|---|---|---|---|
| 2009/0123813 A1* | 5/2009 | Chiang et al. ................... | 429/50 |
| 2011/0068294 A1* | 3/2011 | Zaghib et al. .............. | 252/182.1 |
| 2011/0269022 A1* | 11/2011 | Kawakami et al. .......... | 429/221 |

FOREIGN PATENT DOCUMENTS

| | | |
|---|---|---|
| EP | 1 134 826 A1 | 9/2001 |
| JP | 2001-266882 A | 9/2001 |
| JP | 2011-14445 A | 1/2011 |

OTHER PUBLICATIONS

Verma et al., Influence of silicon substitution on the properties of lithium ferrite, Journal of Alloys and Compounds, 443 (2007), pp. 178-181.*

(Continued)

*Primary Examiner* — Mark Kopec
*Assistant Examiner* — Matthew R Diaz
(74) *Attorney, Agent, or Firm* — Sughrue Mion, PLLC

(57) ABSTRACT

Provided is a novel lithium silicate-based material useful as a positive electrode material for lithium ion secondary battery. The lithium silicate-based compound is represented by $Li_{1.5}FeSiO_{4.25}$. The lithium silicate-based compound is a compound including: lithium (Li); iron (Fe); silicon (Si); and oxygen (O), and expressed by a composition formula, $Li_{1+2\delta}FeSiO_{4+\delta-c}$ ($-0.25 \leq \delta \leq 0.25$, $0 \leq c \leq 0.5$). The lithium silicate-based compound, of which iron (Fe) is trivalent, exerts a remarkable chemical stability as compared to $Li_2FeSiO_4$.

18 Claims, 4 Drawing Sheets

(51) Int. Cl.
  *C01B 33/32* (2006.01)
  *H01M 4/58* (2010.01)
  *H01M 4/62* (2006.01)
  *H01M 4/136* (2010.01)
  *H01M 10/0525* (2010.01)

(52) U.S. Cl.
  CPC .......... *H01M 4/625* (2013.01); *C01P 2002/72* (2013.01); *H01M 4/136* (2013.01); *H01M 10/0525* (2013.01)

(56) References Cited

OTHER PUBLICATIONS

Su et al. ("Ab initio calculations on Li-ion migration in Li2FeSiO4 cathode material with a P21 symmetry structure." Applied Physics Letters 99, 141909, 2011).*

Zhong et al. ("Structural, Electronic, and Electrochemical Properties of Cathode Materials Li2MSiO4 (M=Mn, Fe and Co): Density Functional Calculations." J. Phys. Chem. C 2010, 114, 3693-3700).*

Lv et al. ("A novel Li2FeSiO4/C composite: Synthesis, characterization and high storage capacity." J. Mater. Chem., 2011, 21, 9506-9512).*

International Search Report of PCT/JP2012/004768, dated Sep. 25, 2012.

Anton Nyten, et al., "The lithium extraction/insertion mechanism in $Li_2FeSiO_4$", Journal of Materials Chemistry, 2006, pp. 2266-2272, vol. 16.

Dongping LV, et al., "A novel $Li_2FeSiO_4$/C composite: Synthesis, characterization and high storage capacity", Journal of Materials Chemistry, Jul. 2011, pp. 9506-9512, vol. 21.

Xiaobing Huang, et al., "Synthesis and electrochemical performance of $Li_2FeSiO_4$/C as cathode material for lithium batteries", Solid State Ionics, 2010, pp. 1451-1455, vol. 181.

Masanobu Nakayama, et al., "First-principles Studies on Phase Stability of $Li_2FeSiO_4$ Compounds as Positive Electrode Material for Lithium Ion Battery", The Electrochemical Society of Japan Taikai Koen Yosishu, Mar. 2009, pp. 335, vol. 76.

Notification of Reasons for Refusal in the corresponding Japanese Patent Application No. 2011-226737, dated Dec. 24, 2013.

* cited by examiner

LITHIUM SILICATE-BASED COMPOUND, POSITIVE ELECTRODE ACTIVE MATERIAL FOR LITHIUM ION SECONDARY BATTERY, AND LITHIUM ION SECONDARY BATTERY USING THE SAME

CROSS REFERENCE TO RELATED APPLICATIONS

This application is a National Stage of International Application No. PCT/JP2012/004768 filed Jul. 26, 2012, claiming priority based on Japanese Patent Application No. 2011-226737, filed Oct. 14, 2011, the contents of all of which are incorporated herein by reference in their entirety.

BACKGROUND OF THE INVENTION

1. Field of the Invention

The invention mainly relates to a lithium silicate-based compound that is usefully employed as a positive electrode active material of lithium ion batteries. The invention further relates to a lithium ion secondary battery in which the lithium silicate-based compound is used as an active material.

2. Description of the Related Art

The lithium ion secondary batteries are small-sized batteries that are superior in energy density and extensively used as power supplies of portable electronic devices. A positive electrode active material typically used in the lithium ion secondary batteries is layered compounds including, for example, $LiCoO_2$. In these compounds, however, oxygen is easily desorbed at the temperatures around 150° C. when the batteries are fully charged. This is likely to cause the oxidation exothermic reaction of non-aqueous electrolytic solutions, possibly endangering the safety of batteries.

The positive electrode active materials introduced in recent years are phospho-olivine compounds, $LiMPO_4$ (for example, $LiMnPO_4$, $LiFePO_4$, $LiCoPO_4$). These compounds are attracting attention because of the advantages; improvement of thermal stability through divalent/trivalent oxidation-reduction reaction instead of trivalent/tetravalent oxidation-reduction reaction in which an oxide, such as $LiCoO_2$ is used as a positive electrode active material, and high discharge voltages obtained by arranging the polyanions of hetero elements having high electronegativity around the central metal.

However, the positive electrode materials including the phospho-olivine compounds have some disadvantages. Due to an average discharge voltage as low as 3.5 V or lower and a heavy formula weight of phosphorous polyanions, the theoretical capacities of these positive electrode materials are limited to about 170 mAh/g. With the lithium ion secondary batteries in which $LiCoPO_4$ or $LiNiPO_4$ is used and operation voltages are higher than 4.5 V, it is not possible to find electrolytic solutions capable of withstanding such high charging voltages. With the lithium ion secondary batteries in which $LiMnPO_4$ is used, there is an unsolved problem; severe degradation of cycle characteristics. With the $LiFePO_4$ batteries that are more advantageous than the other batteries in practical use, there is an unsolved problem too; capacity reductions caused by the oxidation of divalent iron.

JP 2001-266882 A discloses lithium silicate-based compounds containing $Li_2FeSiO_4$ (theoretical capacity: 331.3 mAh/g) and $Li_2MnSiO_4$ (theoretical capacity: 333.2 mAh/g) as examples of the positive electrode active material. These positive electrode active materials are the inexpensive and environmental load-reducing materials that are abundantly available. Other advantages of the positive electrode active materials are; large theoretical lithium ion charge/discharge capacities, and no release of oxygen at high temperatures. The lithium silicate-based compounds, which consist of only the metal elements that are abundantly available and obtainable at low prices, are the environmental load-reducing materials with large theoretical lithium ion charge/discharge capacities, wherein oxygen is not released at high temperatures. Thus, the lithium silicate-based compounds having these advantages are prospective positive electrode materials for the next-generation lithium ion secondary batteries.

However, there is still a concern for stability even with $Li_2FeSiO_4$ in which iron (Fe) is divalent because oxidation possibly causes the reductions of battery capacities. It is disclosed in JP 2011-014445 A that $LiFeSi_2O_6$ is used as a positive electrode active material. The compound disclosed in this document, in which iron (Fe) is trivalent, is expected to have a good stability. On the other hand, it is disclosed in this document that the first discharge capacity of the lithium ion secondary battery containing $LiFeSi_2O_6$ as its positive electrode active material was 102.9 mAh/g. This discharge capacity is not as large as the result of the comparative example in which $LiFePO_4$ is used.

SUMMARY OF THE INVENTION

Problems to be Solved by the Invention

The invention provides a novel lithium silicate-based compounds superior in stability in the presence of trivalent iron (Fe). The invention further provides a lithium ion secondary battery containing the lithium silicate-based compound as its positive electrode active material, wherein a large discharge capacity is accomplished by the use of the positive electrode active material.

Means for Solving Problems

A lithium silicate-based compound according to the invention is a lithium silicate-based compound including: lithium (Li); iron (Fe); silicon (Si); and oxygen (O), and expressed by a composition formula, $Li_{1+2\delta}FeSiO_{4+\delta-c}$ ($-0.25 \leq \delta \leq 0.25$, $0 \leq c \leq 0.5$).

The lithium silicate-based compound according to the invention is a monoclinic crystal that belongs to space group $P2_1/n$. The value of δ in the composition formula is preferably δ=0 to 0.25. In the composition formula, iron (Fe) preferably has an electronic state where trivalent iron (Fe) is present by 70% or more. A positive electrode active material for lithium ion secondary battery may include carbon (C) and lithium carbonate ($Li_2CO_3$).

In the positive electrode active material used as the positive electrode for lithium ion secondary battery, preferably, iron present therein is all trivalent, and at least two different kinds of $Fe^{3+}$ in different states are present in $^{57}Fe$ Mössbauer spectroscopic analysis after charging. In the positive electrode active material used as the positive electrode for lithium ion secondary battery, preferably, $Fe^{2+}$ and $Fe^{3+}$ are present, and $Fe^{2+}$ is present by 50 to 80% in $^{57}Fe$ Mössbauer spectroscopic analysis after discharging.

The invention is suitably applicable to positive electrodes for lithium secondary batteries and for secondary batteries as structural elements thereof.

Operational Advantages of the Invention

The lithium silicate-based compound expressed by $Li_{1+2\delta}FeSiO_{4+\delta-c}$ ($-0.25 \leq \delta \leq 0.25$, $0 \leq c \leq 0.5$), of which iron (Fe) is trivalent, is a compound more stable than compounds with unstable divalent Fe. Therefore, lithium ion secondary batteries, in which the lithium silicate-based compound according to the invention is used as an active material, exhibit stable cycle characteristics even after the batteries are repeatedly charged and discharged.

DESCRIPTION OF THE PREFERRED EMBODIMENTS

Figure 1:
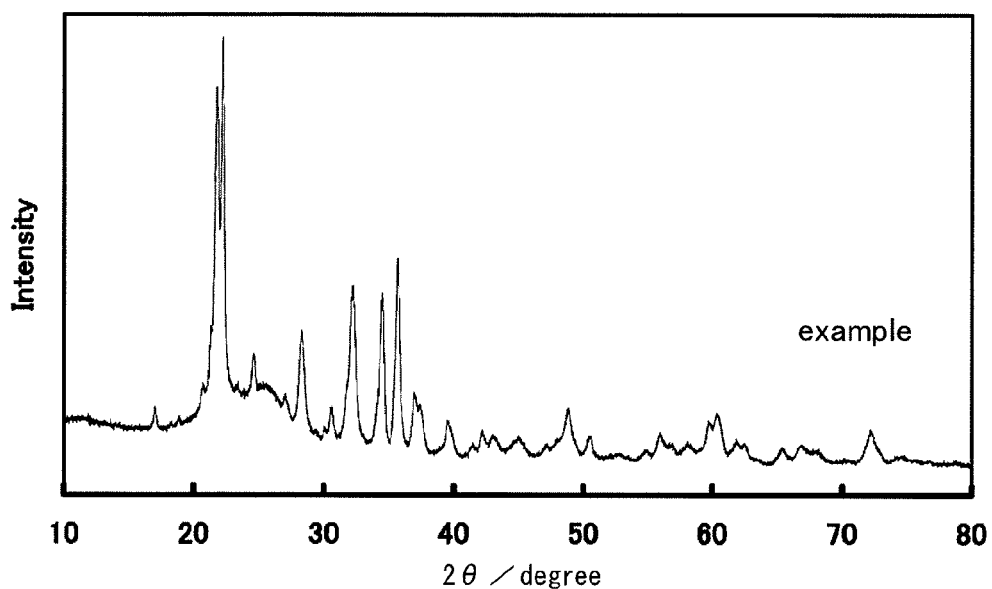
FIG. 1 shows an X-ray diffraction pattern of a lithium silicate-based compound according to an example of the invention.

Describing the characteristics of the lithium silicate-based compound according to the invention, it is a lithium silicate-based compound including lithium (Li), iron (Fe), silicon (Si), and oxygen (O) and expressed by a composition formula, $Li_{1+2\delta}FeSiO_{4+\delta-c}$ ($-0.25 \leq \delta \leq 0.25$, $0 \leq c \leq 0.5$).

In the lithium silicate-based compound expressed by $Li_{1+2\delta}FeSiO_{4+\delta-c}$ ($-0.25 \leq \delta \leq 0.25$, $0 \leq c \leq 0.5$), the range of values of $\delta$ is $-0.25 \leq \delta \leq 0.25$. In lithium ion secondary batteries in which the lithium silicate-based compound thus defined is used as an active material, characteristics of the batteries can be prevented from degrading.

The details of the lithium silicate-based compound expressed by $Li_{1+2\delta}FeSiO_{4+\delta-c}$ ($-0.25 \leq \delta \leq 0.25$, $0.25$, $0 \leq c \leq 0.5$) are disclosed by hereinafter describing a method for producing the lithium silicate-based compound thus defined.

Reaction of First Stage

To produce the lithium silicate-based compound, a lithium silicate-based compound precursor is prepared in advance. The lithium silicate-based compound precursor is prepared by, for example, solid-phase reaction method, hydrothermal method, sol-gel method, or Pechini method. A detailed description is given below to an example in which the molten salt method is employed.

In a reaction of a first stage, lithium silicate expressed by $Li_2SiO_3$ and a source of iron are reacted in a molten salt containing at least one selected from alkali metal salts at temperatures from 300° C. to 600° C. under a mixed gas atmosphere containing carbon dioxide and a reducing gas. As a result, the lithium silicate-based compound precursor is obtained. The source of iron is, for example, pure iron, iron hydroxide, iron oxalate, iron chloride, iron nitrate, or an iron-containing precipitate formed by alkalifying an iron-containing aqueous solution.

The production method that uses the iron-containing precipitate provides a lithium silicate-based compound precursor having a chemical composition and properties different to those of a lithium silicate-based compound precursor obtained by the use of iron oxalate. The lithium silicate-based compound precursor thus synthesized has remarkably improved material characteristics suitable for batteries.

Composition of Molten Salt

The alkali metal salt is one selected from a group consisting of lithium salt, potassium salt, sodium salt, rubidium salt, and cesium salt. Of these salts, lithium salt is most desirably used.

The alkali metal salt, though not particularly limited to any particular one, preferably contains at least one selected from alkali metal carbonates, alkali metal chlorides, alkali metal nitrates, and alkali metal hydroxides. Specific examples are: lithium carbonate ($Li_2CO_3$), potassium carbonate ($K_2CO_3$), sodium carbonate ($Na_2CO_3$), rubidium carbonate ($Rb_2CO_3$), cesium carbonate ($Cs_2CO_3$), lithium chloride (LiCl), potassium chloride (KCl), rubidium chloride (RbCl), cesium chloride (CsCl), lithium nitrate ($LiNO_3$), potassium nitrate ($KNO_3$), sodium nitrate ($NaNO_3$), rubidium nitrate ($RbNO_3$), cesium nitrate ($CsNO_3$), lithium hydroxide (LiOH), potassium hydroxide (KOH), sodium hydroxide (NaOH), rubidium hydroxide (RbOH), and cesium hydroxide (CsOH). Only one of these examples may be used, or two or more selected from these examples may be combined and used.

A molten salt containing lithium carbonate alone has a melting temperature around 700° C. In the case of a molten salt mixedly containing lithium carbonate and any other alkali metal salt, its melting temperature is lower, 600° C. or below. Thus, the lithium silicate-based compound to be desirably obtained can be synthesized at relatively low reaction temperatures between 300 and 600° C. As a result, the growth of grains during the synthesizing reaction is inhibited, and the lithium silicate-based compound is thereby finely formed.

The molten salt is selected from the before-mentioned alkali metal salts so that the melting temperature is equal to or lower than 600° C. In the case of a mixture of alkali metal salts, the mixing ratio of the alkali metal salts is adjusted so that the melting temperature of the mixture is equal to or lower than 600° C. The mixing ratio, which may differ depending on which of the salts is used, is difficult to be categorically defined.

In a carbonate mixture containing lithium carbonate as an essential material and further containing any other carbonate salt, for example, lithium carbonate is preferably included in the mixture by 30 mol % or more or by percentages between 30 and 70 mol %, where the whole carbonate mixture is 100 mol %. Specific examples of the carbonate mixture are mixtures containing lithium carbonate by 30 to 70 mol %, sodium carbonate by 0 to 60 mol %, and potassium carbonate by 0 to 50 mol %. More preferable specific examples of the carbonate mixture are mixtures containing lithium carbonate by 40 to 45 mol %, sodium carbonate by 30 to 35 mol %, and potassium carbonate by 20 to 30 mol %.

The melting temperatures (melting points) of alkali metal nitrates and alkali metal hydroxides are at most about 450° C. (lithium hydroxide). Therefore, low reaction temperatures can be obtained in any molten salts containing only one of these nitrates and hydroxides.

As to the mixing ratio of lithium silicate expressed by $Li_2SiO_3$ and the source of iron, iron (Fe) is preferably mixed in a quantity of 0.9 to 1.2 mol or preferably 0.95 to 1.1 mol for 1 mol of lithium silicate.

In the reaction of the first stage, the mixture of such raw materials needs to be reacted at temperatures between 300 and 600° C. in the molten salt under the mixed gas atmosphere containing carbon dioxide and the reducing gas.

Though no specific method of reaction is particularly defined, typically, the raw material of the molten salt containing at least one selected from the alkali metal salts, lithium silicate, and the source of iron are evenly mixed by using, for example, a ball mill, and the mixture is heated to temperatures higher than the melting temperature of the raw material of the molten salt until the raw material of the molten salt is melted. In the molten salt, lithium, silicon, and iron are progressively reacted. As a result, the lithium silicate-based compound precursor is finally obtained.

The mixing ratio of lithium silicate, the source of iron, and the molten salt raw material is not particularly limited as far as these materials are mixed well enough to evenly disperse in the molten salt. For 100 parts by mass of the lithium silicate compound and the source of iron in total, the quantity of the molten salt raw material in total is preferably 20 to 300 parts by mass, more preferably 50 to 200 parts by mass, or even more preferably 60 to 80 parts by mass.

The reaction temperature of the source of iron and lithium silicate in the molten salt is 300 to 600° C., or preferably 400 to 560° C. At temperatures lower than 300° C., oxide ions ($O^{2-}$) are difficult to be discharged into the molten salt, and it takes impractically long time to synthesize the lithium silicate based compound precursor. At temperatures higher than 600° C., grains of the obtained lithium silicate-based compound precursor are likely to become coarse.

The reaction described above is carried out under the mixed gas atmosphere containing carbon dioxide and the reducing gas. Then, iron in the molten salt is stably present in the form of divalent ions during the reaction. Under the atmosphere, iron, though its oxidation number is not two before the reaction, stably remains divalent. The ratio of carbon dioxide and the reducing gas is not particularly limited. However, an adequately large quantity of the reducing gas decreases carbon dioxide controlling the oxidizing atmosphere. This accelerates the decomposition of the molten salt raw material, leading to a higher rate of reaction. With an excessive quantity of the reducing gas, the reducing performance is too aggressive, possibly reducing divalent iron of the lithium silicate-based compound precursor to an extent that the reactant may be broken. The mixing ratio of the reducing gas is preferably 1 to 40, or more preferably 3 to 20 by volume ratio for 100 of carbon dioxide. Examples of the reducing gas are hydrogen and carbon monoxide, and hydrogen is preferably used.

The pressure of the mixed gas containing carbon dioxide and the reducing gas, though not particularly limited, is normally atmospheric pressure, or may be increased pressure or reduced pressure.

The reaction time of the source of iron and the lithium silicate compound is normally 10 minutes to 70 hours, more preferably 5 to 25 hours, or even more preferably 10 to 20 hours.

When the reaction is over, the reactant is cooled, and the alkali metal salt used as a flux is removed. As a result, the lithium silicate-based compound precursor is obtained. A preferred method of removing the alkali metal salt is to dissolve and remove the alkali metal salt by washing the reactant with a solvent that can dissolve the alkali metal salt solidified by cooling after the reaction. An example of the solvent is water.

Lithium Silicate-Based Compound Precursor

The lithium silicate-based compound precursor obtained by the reaction of the first stage is expressed by the composition formula of $Li_2FeSiO_4$. The reaction generated in the molten salt at low temperatures, 600° C. or below, inhibits the growth of crystal grains, providing very fine crystal grains having an average grain size of a few μm or smaller. This greatly decreases the quantity of impurity phase.

The lithium silicate-based compound precursor synthesized at relatively low temperatures is obtained in the form of fine grains and accordingly has a very large specific surface area. Preferably, the specific surface area is equal to or larger than 15 $m^2/g$ or preferably equal to or larger than 30 $m^2/g$. Even more preferably, the specific surface area ranges from 35 to 50 $m^2/g$. The specific surface area can be measured by nitrogen physical absorption in which BET adsorption isotherm is employed.

Reaction of Second Stage

However, the lithium silicate based compound precursor prepared by the reaction of the first stage is $Li_2FeSiO_4$. This lithium silicate based compound precursor, of which iron (Fe) is divalent, has a problem in stability. The lithium silicate-based compound according the invention is obtained through compounding of the lithium silicate-based compound precursor and carbon (C). This lithium silicate-based compound is expressed by the composition formula, $Li_{1+2\delta}FeSiO_{4+\delta-c}$ ($-0.25 \leq \delta \leq 0.25$, $0 \leq c \leq 0.5$). Hereinafter is described a method for producing the lithium silicate-based compound. The production method forms a carbon composite material in a reaction of a second stage and then performs a forming reaction of a target product to be stored in a third stage.

In the reaction of the second stage, the source of carbon and the lithium silicate-based compound precursor obtained by the reaction of the first stage are mixed well to form a carbon composite material. Though no specific method for forming the carbon composite material is particularly defined, examples of the usable method are; gas-phase method in which a thermal treatment is performed under an atmosphere containing a carbon-containing gas such as methane gas, ethane gas, or butane gas, and pyrolysis method in which an organic material used as the source of carbon and the lithium silicate-based compound precursor are evenly mixed and subjected to a thermal treatment to carbonize the organic material.

A particularly preferred method is mechanical milling wherein a carbon material is added to the lithium silicate-based compound precursor and mixed evenly in a ball mill until the lithium silicate-based compound precursor is amorphized. Then, the amorphized lithium silicate-based compound precursor is subjected to a thermal treatment. According to the mechanical milling, the lithium silicate-based compound precursor is amorphized by ball milling and evenly mixed with carbon to increase a degree of bonding. Further, the thermal treatment recrystalizes the lithium silicate-based compound precursor, and at the same time, makes carbon uniformly deposited around the lithium silicate-based compound precursor.

As to a preferable degree of amorphization, a ratio of B(011) crystal to B(011) mill is about 0.1 to 0.5 in an X-ray diffraction measurement that uses CuKα ray as a light source, where B(011) crystal is a half-value width of a (011) surface-derived diffraction peak in a crystalline sample before ball milling, and B(011) mill is a half-value width of the same diffraction peak in a sample obtained by ball milling.

Examples of the carbon material used in the reaction of the second stage are acetylene black (AB), ketjen black (KB), and graphite. As to the mixing ratio of the lithium silicate-based compound precursor and the carbon material, the mass ratio of the carbon material, which is carbon (C), is 0.1 to 10 for the mass ratio 1 of the lithium silicate-based compound precursor. To enhance the progression of a reaction of a third stage described later, a larger quantity of carbon than the lithium silicate-based compound precursor is necessary. The carbon material unused and left after the reaction of the second stage ends can be reused as a conductive material of electrodes.

After the ball milling is performed until the lithium silicate-based compound precursor is amorphized, a thermal treatment is performed. The thermal treatment is performed under a reducing atmosphere so that iron ions included in the lithium silicate-based compound precursor remain divalent. Similarly to the reaction of the first stage, the reducing atmosphere is preferably a mixed gas atmosphere containing carbon dioxide and a reducing gas so that the divalent iron ions are not reduced into metallic state. The mixing ratio of carbon dioxide and the reducing gas may be similar to the mixing ratio described in the reaction of the first stage.

The thermal treatment is preferably performed at temperatures between 500 and 800° C. The thermal treatment temperatures lower than the range of temperatures make it difficult to uniformly deposit carbon around the lithium silicate-based compound precursor. On the other hand, the thermal treatment temperatures higher than the range of temperatures possibly cause the decomposition or lithium vacancy of the lithium silicate-based compound precursor, unfavorably decreasing the charging and discharging capacity. The thermal treatment is normally performed for 30 minutes to 10 hours.

Reaction of Third Stage

The carbon composite material obtained by the production method in the second stage is considered to undergo a reaction where carbon absorbs Li over a long-term storage. As a result of the reaction, $Li_2FeSiO_4$ transforms into the lithium silicate-based compound expressed by $Li_{1+2\delta}FeSiO_{4+\delta-c}$ ($-0.25 \leq \delta \leq 0.25$, $0 \leq c \leq 0.5$), and $Li_2CO_3$ is generated as a by-product. Because this reaction is developed at room temperature as well, a storage period of about one year results in the formation of the lithium silicate-based compound. As a result, the lithium silicate-based active material according to the invention is obtained.

The carbon composite material may be stored at room temperature, or the reaction time may be shortened through various adjustments of reaction conditions, such as temperature, pressure, and/or atmosphere.

Positive Electrode for Lithium Ion Secondary Battery

The lithium silicate-based compound according to the invention is effectively used as an active material for positive electrodes of lithium secondary batteries. The positive electrode, in which the lithium silicate-based active material is used, may be structurally similar to the positive electrodes of the conventional lithium ion secondary batteries.

For example, a conductive material such as acetylene black (AB), ketjen black (KB), vapor grown carbon fiber (VGCF), a binder such as polyvinylidene fluoride (PVdF), polytetrafluoroethylene (PTFE), styrene-butadiene rubber (SBR), and/or a solvent such as N-methyl-2-pyrrolidone (NMP) is added to the lithium silicate-based compound. Then, the resulting lithium silicate-based compound is kneaded into a paste-like state. When the paste-like material is applied to a collector, a positive electrode is obtained. The quantity of the conductive material to be added, though not particularly limited, may be 5 to 20 parts by mass for 100 parts by mass of the lithium silicate-based active material. The quantity of the binder to be added, though not particularly limited, may be 5 to 20 parts by mass for 100 parts by mass of the lithium silicate-based active material. The positive electrode may be formed as follows; a mixture containing the lithium silicate-based active material, conducive material and binder is kneaded in a mortar or by a pressing machine and formed in a film-like shape, and then bonded to the collector by the pressing machine.

The collector is not particularly limited. Any one of the materials conventionally used as the positive electrodes of lithium ion secondary batteries, for example, aluminum foil, aluminum mesh, and stainless steel mesh may be used. Other examples of the collector material are carbon unwoven cloth and carbon woven cloth.

Though the shape and the thickness of the positive electrode for lithium ion secondary battery according to the invention are not particularly limited, the thickness of the positive electrode is preferably adjusted to 10 to 200 μm or more preferably to 20 to 100 μm by compressing the applied active material. Thus, depending on the type and the structure of the collector to be used, the quantity of the active material may be suitably decided so that the positive electrode has the above thickness after compressing.

Lithium Silicate-Based Active Material in Charged or Discharged State

The inventors of the invention checked the valence of Fe in the carbon composite material through $^{57}Fe$ Mössbauer spectroscopy during the reaction of the second stage. In the lithium silicate-based compound precursor before ball milling, Fe was overwhelmingly divalent. In the lithium silicate-based compound precursor subjected to the thermal treatment after ball milling, however, the divalent Fe decreased to about 50%, whereas trivalent Fe was present by about 50%.

In the lithium silicate-based compound according to the invention obtained after the reaction of the third stage, however, Fe present therein was all trivalent. When the lithium silicate-based compound is used as the positive electrode active material for charging and discharging, the valence of iron repeatedly changed back and forth between divalent and trivalent. After discharging, the trivalent Fe is present by 20 to 80% or preferably by 20 to 30%.

Lithium Ion Secondary Battery

Any conventional technique can be used to produce the lithium ion secondary battery in which the positive electrode for lithium ion secondary battery described earlier is used. The positive electrode described earlier is used as a positive electrode material, and any of known lithium metals, a conventional carbon-based material such as graphite, a silicon-based material such as a silicon thin film, a copper-tin or cobalt-tin alloy material, or an oxide material such as lithium titanate is used as a negative electrode material. A solution used as the electrolytic solution is prepared by dissolving a lithium salt such as lithium hyperchloride, $LiPF_6$, $LiBF_4$, or $LiCF_3SO_3$ at a concentration between 0.5 mol/L and 1.7 mol/L in a conventional non-aqueous solvent containing ethylene carbonate, dimethyl carbonate, propylene carbonate, or diethyl carbonate. By using the known battery elements in addition to the prepared materials, the lithium ion secondary battery is built by a conventionally employed method.

EXAMPLE

The details of the lithium silicate-based compound of the example are disclosed by hereinafter describing a method for producing the lithium silicate-based compound.

Reaction of First Stage

First, 20 mL of acetone was added to a mixture containing 0.03 mol of lithium silicate ($Li_2SiO_3$) (Kishida Chemical Co., Ltd.; purity of 99.5%) and 0.03 mol of iron (Kojundo Chemical Laboratory Co., Ltd.; purity of 99.90). The resulting mixture was stirred with a zirconia ball mill at 500 rpm for 60 minutes and then dried. The mixture was then mixed with a carbonate mixture. The carbonate mixture was prepared by mixing lithium carbonate (Kishida Chemical Co., Ltd.; purity of 99.9%), sodium carbonate (Kishida Chemical Co., Ltd.; purity of 99.5%), and potassium carbonate (Kishida Chemical Co., Ltd.; purity of 99.5%) at the molar ratio of 0.435 mol:0.315 mol:0.25 mol. The mixing ratio was 90 parts by mass of the carbonate mixture for 100 parts by mass of lithium silicate and iron in total.

Then, 20 ml of acetone was added to the mixture, and the resulting mixture was stirred with a zirconia ball mill at 500 rpm for 60 minutes and then dried. Then, fine particles thereby obtained were put in a gold melting pot and heated in an electric furnace at 500° C. under a mixed gas atmosphere containing carbon dioxide (flow rate: 100 ml/min) and hydrogen (flow rate: 3 ml/min) to cause a reaction for 13 hours in the fine particles in which the carbonate mixture was in molten state. After the reaction, a whole rector core constituting a reaction system was removed from the electric furnace and cooled to room temperature with the mixed gas being supplied thereto.

The obtained reactant, after 20 ml of water was added thereto, was ground in a mortar and then washed and filtered with water repeatedly. As a result, salt-free fine particles were obtained. The fine particles were put in a drier and heated to 100° C., and then dried for about an hour.

Reaction of Second Stage

The obtained fine particles and acetylene black (AB) were mixed at the mass ratio of 5:4 and then subjected to a mechanical milling process performed by a mechanical milling device (Fritsch Japan Co., Ltd.) at 450 rpm for five hours under an air atmosphere. Then, the processed fine particles were heated at 700° C. for two hours under a mixed gas atmosphere containing carbon dioxide and hydrogen at the volume ratio of 100:3. As a result, a carbon composite material was obtained.

Reaction of Third Stage

The fine particles including the carbon composite material after the thermal treatment were put in a desiccator and stored at room temperature for a year. As a result, fine particles consisting primarily of the lithium silicate-based compound according to the example were obtained.

Comparative Example

In the example, the reactions of the first and second stages were performed, and fine particles containing the carbon composite material immediately after the reaction of the second stage were used as a comparative example.

Test 1

Figure 2:
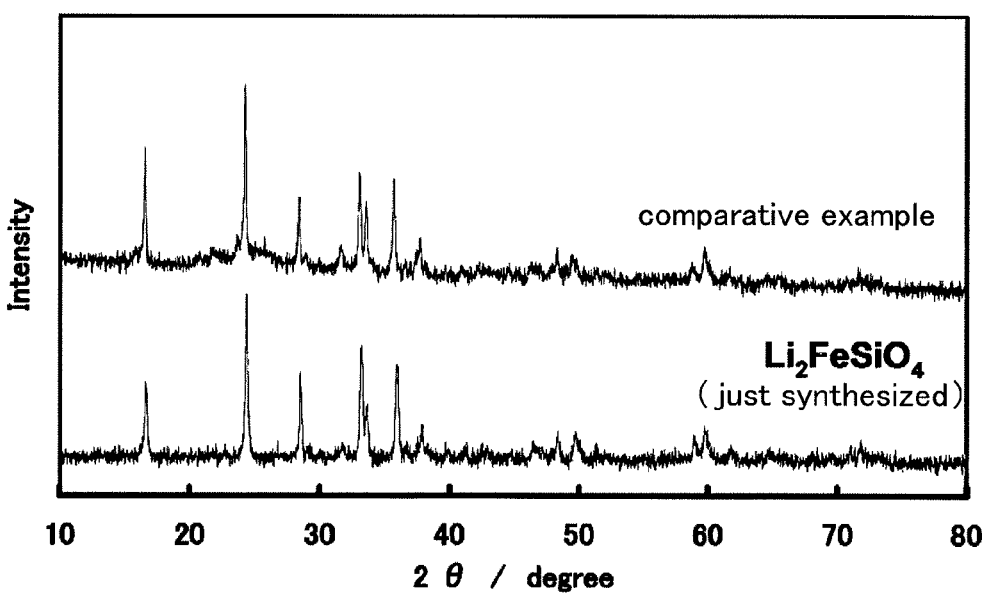
FIG. 2 shows an X-ray diffraction pattern of a lithium silicate-based compound according to a comparative example.

The XRD measurement (radiation source: CuKα) was performed to the fine particles of the example, fine particles of the comparative example, and fine particles of the example just synthesized by the reaction of the first stage, results of which are shown in FIGS. 1 and 2. The XRD pattern of the fine particles according to the comparative example, which is illustrated in FIG. 2, is almost identical to the XRD pattern of the fine particles according to the example just synthesized by the reaction of the first stage. On the other hand, the XRD pattern of the fine particles according to the example is totally different to the XRD pattern of the fine particles according to the comparative example. This demonstrates that the lithium silicate-based compound of the fine particles according to the example and that of the fine particles according to the comparative example have different compositions. It was also learnt that the fine particles according to the example illustrated in FIG. 1 included XRD patterns of $Li_2CO_3$, $Fe_3O_4$, $Li_2SiO_3$, and carbon.

Figure 3:
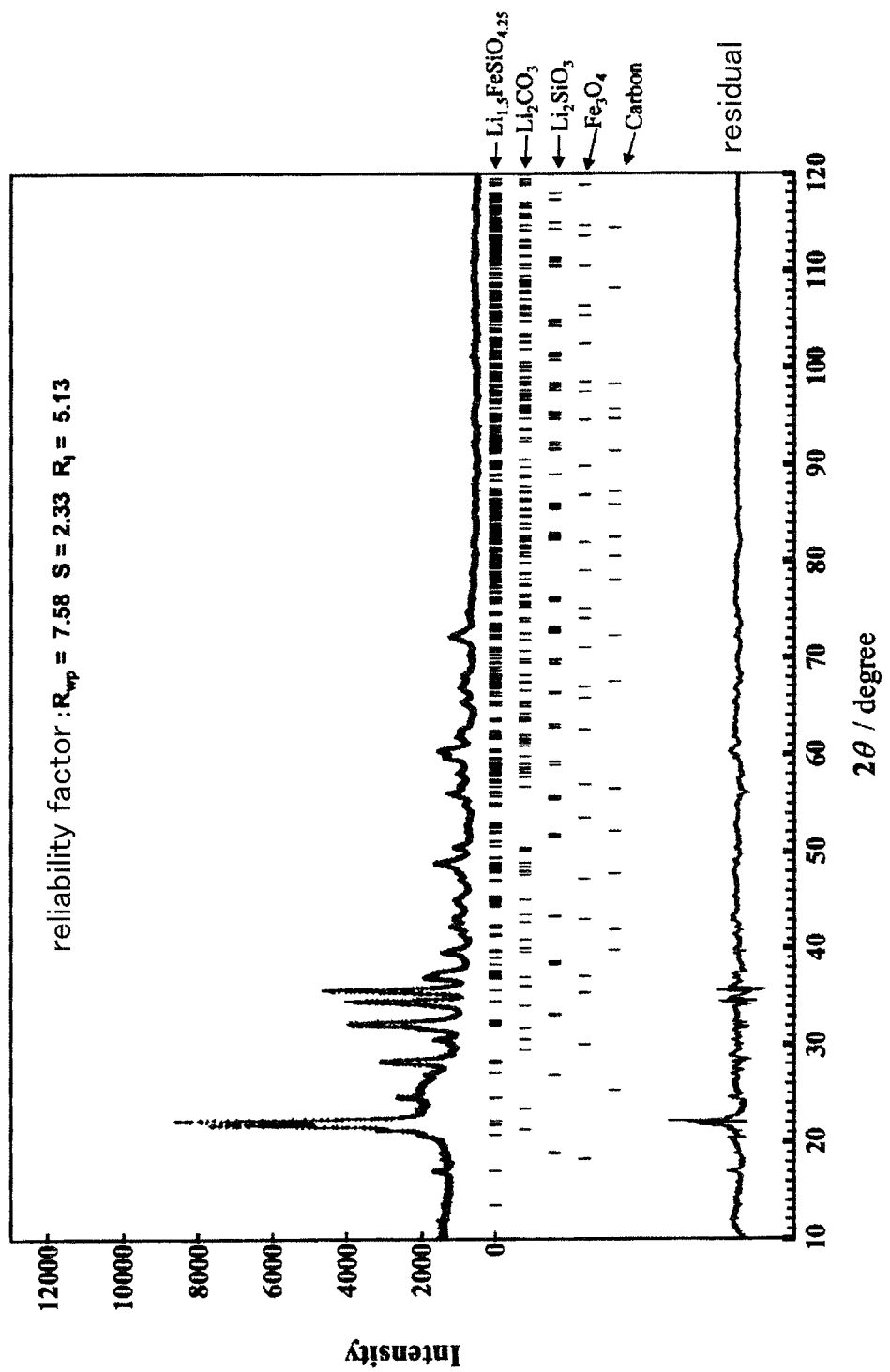
FIG. 3 shows a result of Rietveld analysis of the X-ray diffraction pattern of the lithium silicate-based compound according to the example.

The lithium silicate-based compound was subjected to Rietveld analysis based on a model of monoclinic $Li_{1.5}FeSiO_{4.25}$ that belongs to space group $P2_1/n$ with disordered lithium ions ($Li^+$) and iron ions ($Fe^{3+}$) (FIG. 3). The calculated values of $Li_{1.5}FeSiO_{4.25}$ and patterns obtained from different phases ($Li_2CO_3$, $Fe_3O_4$, $Li_2SiO_3$, and carbon) were successfully fitted to the actual values obtained by measurement. The low reliability factors (Rwp=7.58, S=2.33, RI=5.13) obtained by the analysis confirmed the formation of $Li_{1.5}FeSiO_{4.25}$. The lattice constants of $Li_{1.5}FeSiO_{4.25}$ are; a=8.39888(8) Å, b=5.0278(1) Å, c=8.3546(5) Å, and β=10.3310(4) degrees, where numbers in the parentheses represent the standard deviations. The compound had a monoclinic crystal system and belonged to space group $P2_1/n$.

Test 2

Figure 4:
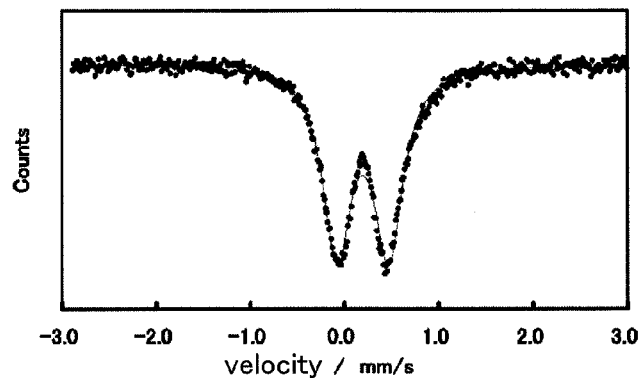
FIG. 4 shows a measurement result obtained by $^{57}$Fe Mössbauer spectroscopy of the lithium silicate-based compound according to the example.
Figure 5:
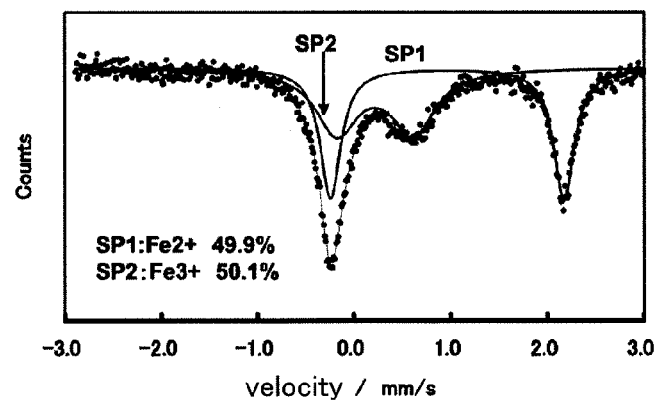
FIG. 5 shows a measurement result obtained by $^{57}$Fe Mössbauer spectroscopy of the lithium silicate-based compound according to the comparative example.

The fine particles according to the example and the fine particles according to the comparative example were respectively measured by $^{57}Fe$ Mössbauer spectroscopy, results of which are shown in FIGS. 4 and 5. The conditions of the measurement are given below.
Device:
  "FGX-100" (Topologic Systems Co., Ltd.)
  (δ radiation source: $^{57}Co$ dispersed in Rh matrix)
Conditions:
  velocity: ±3 mm/s, room temperature,
  velocity criterion: α-Fe
Analysis The analysis was performed, wherein a set of two Lorentz absorption lines arranged symmetrically, which is a typical shape of paramagnetic materials, was used as one of doublet components. A displacement of a center position between the two absorption lines from zero velocity was calculated as an isomer shift value, and attribution of the valence of iron was based on the isomer shift value. The quantities of components were calculated based on an area ratio of the doublet components.

In the fine particles of the example, Fe present therein was all trivalent (isomer shift value: 0.1962(5) mm/s) (FIG. 4). In the fine particles of the comparative example, however, divalent Fe (isomer shift value: 0.965(1) mm/s) was present by 49.9%, and trivalent Fe (isomer shift value: 0.219(5) mm/s) was present by 50.1% (FIG. 5). This clearly indicates that the whole Fe in the lithium silicate-based compound according to the example changed to trivalent Fe in the reaction of the third stage (FIG. 4). Based on the fact that the fine particles of the example contain $Li_2Co_3$, evidently, carbon in the carbon composite material absorbed Li, causing the composition to change from $Li_2FeSiO_4$ to $Li_{1.5}FeSiO_{4.25}$ in the reaction of the third stage.

Test 3

A lithium ion secondary battery was produced, wherein the fine particles produced in the example were used as the positive electrode active material, and characteristics of the battery were evaluated.

Production of Positive Electrode

A mixture of the fine particles produced in the example: conductive auxiliary agent (acetylene black (AB)):polytetrafluoroethylene (PTFE)=17.1:4.7:1 (mass ratio) was prepared and kneaded, and then formed in the shape of a film. Then, the film was press-bonded to an aluminum mesh (#100 mesh; in the size of 20 mm×25 mm) by a mechanical bench press to obtain an electrode, and the obtained electrode was dried in vacuum at 140° C. for three hours and used as a positive electrode.

Production of Negative Electrode

A lithium foil (Honjo Metal Co., Ltd.) was press-bonded to a copper mesh (#100 mesh; in the size of 20 mm×25 mm) to obtain a negative electrode.

Production of Lithium Ion Secondary Battery

The positive and negative electrodes were covered with a laminate film. A separator including a polypropylene microporous film ("Celgard 2400" supplied by Celgard, LLC.) was interposed between the positive and negative electrodes. The positive and negative electrodes with the separator interposed therebetween were covered with a laminate film to seal three sides thereof, and the electrolytic solution was injected into the bag-shaped laminate film. After that, an unsealed side of the film was sealed so that all of the four sides were air-tightly sealed. As a result, a laminate cell with all of polar plates and the electrolytic solution sealed therein was obtained. The electrolytic solution was prepared by dissolving $LiPF_6$ in a mixed solution of EC (ethylene carbonate):DMC (dimethyl carbonate)=1:1 (volume ratio) at the concentration of 1 mol/L. The positive and negative electrodes were provided with a tab electrically connectable to outer components and partly extending on the outside of the laminate cell. As a result of these processes, a lithium ion secondary battery in the form of a laminate cell (bipolar pouch cell) was obtained.

Figure 6:
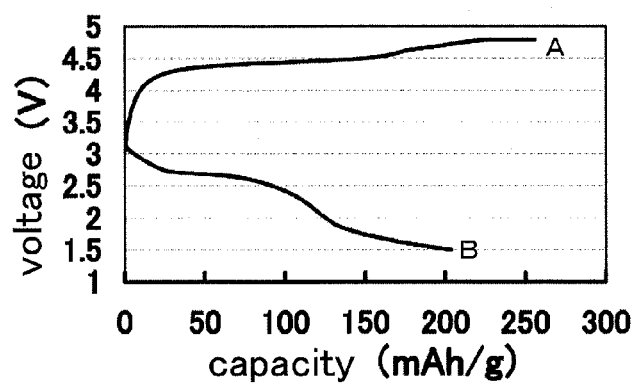
FIG. 6 shows a first charging and discharging curve of a lithium ion secondary battery in which the lithium silicate-based compound according to the example is used as a positive electrode active material.

The lithium ion secondary battery was subjected to a charging and discharging test (first cycle alone) performed at 30° C. The conditions of the test were; electrode density of 0.1 C rate (0.05 mA/cm$^2$), voltage range of 4.8 to 1.5 V (charged at the constant voltage of 4.8 V for 10 hours in the first cycle alone). FIG. 6 shows a charging and discharging curve thereby obtained. Even when Fe was all trivalent before charging and discharging in the lithium silicate-based active material of the positive electrode, a charging and discharging capacity illustrated in FIG. 6 could be retrieved.

Test 4

Figure 7:
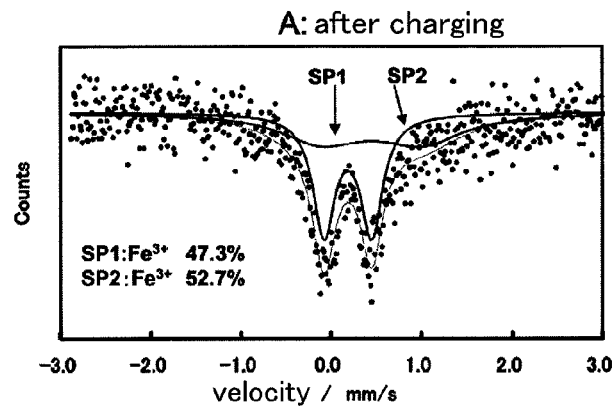
FIG. 7 shows a measurement result obtained by $^{57}$Fe Mössbauer spectroscopy of the positive electrode active material after charging in the lithium ion secondary battery in which the lithium silicate-based compound according to the example is used as the positive electrode active material.
Figure 8:
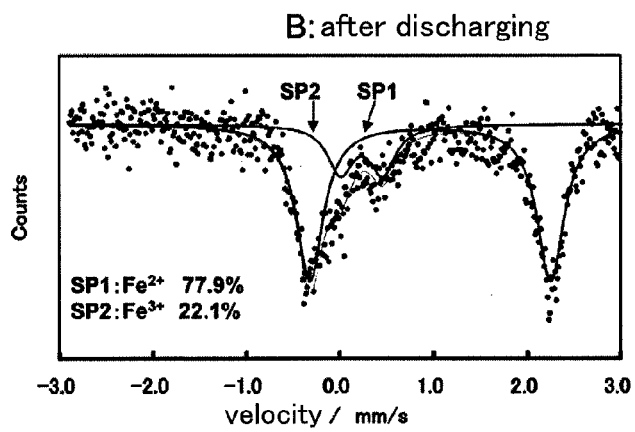
FIG. 8 shows a measurement result obtained by $^{57}$Fe Mössbauer spectroscopy of the positive electrode active material after discharging in the lithium ion secondary battery in which the lithium silicate-based compound according to the example is used as the positive electrode active material.

The valence of iron in the positive electrode active material in the test 3 was measured after charging (point A in FIG. 6) and after discharging (point B in FIG. 6) and respectively evaluated by $^{57}$Fe Mössbauer spectroscopy, results of which are shown in FIGS. 7 and 8.

After charging, Fe was all trivalent, wherein two different kinds of Fe in different states were present respectively by 47.3% (isomer shift value: 0.45(6) mm/s) and 52.7% (isomer shift value: 0.188(5) mm/s). After discharging, trivalent Fe was present by 22.1% (isomer shift value: 0.23(1) mm/s), and divalent Fe was present by 77.9% (isomer shift value: 0.964(3) mm/s).

Test 5

A lithium ion secondary battery was produced, wherein the fine particles according to the example were used as the positive electrode active material, and cycle characteristics of the battery were evaluated.

Production of Positive Electrode

A mixture of the fine particles produced in the example: conductive auxiliary agent (acetylene black (AB)):polytetrafluoroethylene (PTFE)=17.1:4.7:1 (mass ratio) was prepared and kneaded, and then formed in the shape of a film. Then, the film was press-bonded to a circular aluminum mesh of Φ14 mm (#100 mesh) by a mechanical bench press to produce a electrode. The produced electrode was dried in vacuum at 140° C. for three hours and used as a positive electrode.

Production of Negative Electrode

A mixture of graphite fine particles: conductive auxiliary agent (ketjen black (KB)):polyvinylidene fluoride (PVdF)=90:2:8 (mass %) was prepared, and n-methyl-2-pyrorridone was added to the mixture to obtain a slurry for a negative electrode. The slurry was applied to an electrolytic copper foil (collector) having the thickness of 18 μm by using a doctor blade to produce a negative electrode. Then, the negative electrode was dried at 80° C. for 30 minutes so that the organic solvent was volatized and removed from the negative electrode. After drying, the electrode density of the negative electrode was adjusted by a roll pressing machine. Then, the negative electrode was heated and cured in a vacuum drying furnace at 170° C. for eight hours.

Electrolytic Solution

An electrolytic solution was prepared by dissolving electrolytic $LiPF_6$ at the concentration of 1.0 mol/L in a mixed solvent in which ethylene carbonate and dimethyl carbonate were mixed by the volume ratio of 1:1.

Lithium Ion Secondary Battery

A coin battery was produced, wherein the obtained positive and negative electrodes were used. Specifically, a separator including a polypropylene microporous film having the thickness of 25 μm ("Celgard 2400" supplied by Celgard, LLC.) and a filter formed of glass unwoven cloth and having the thickness of 500 μm were interposed between the positive and negative electrodes in a dry room. As a result, an electrode battery was obtained. The electrode battery was housed in a battery case, which was a container made of stainless steel (CR2032 coin battery member), and the electrolytic solution was injected into the battery case. The battery case was sealed by a caulking device. As a result, a lithium ion secondary battery was obtained.

Charging and Discharging Test

Figure 9:
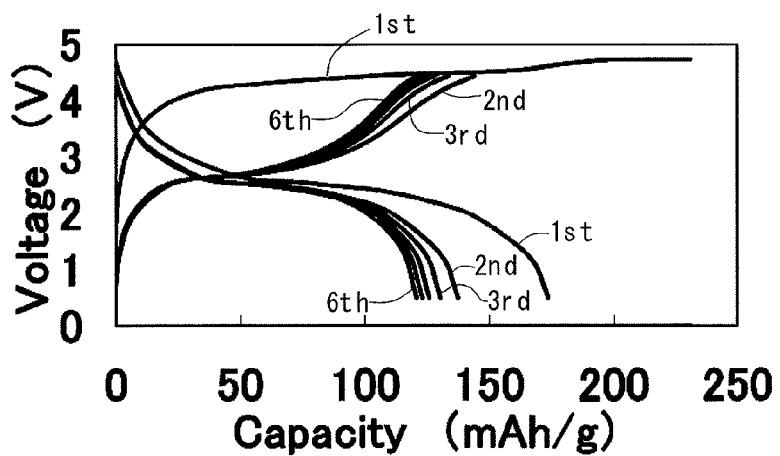
FIG. 9 shows a charging and discharging curve of the lithium ion secondary battery in which the lithium silicate-based compound according to the example is used as the positive electrode active material.

The coin battery was subjected to a charging and discharging test performed at 30° C. FIG. 9 illustrates a charging and discharging curve obtained from six cycles of charging and discharging at the current density of 0.1 C rate (0.05 mA/cm$^2$) within the voltage range of 4.4 to 0.5V (charged at the constant voltage of 4.7 V for 10 hours in the first cycle alone).

As is clearly known from FIG. 9, the battery, in which the lithium silicate-based active material according to the example is used as the positive electrode, exhibited the initial charging capacity of 231 mAh/g and the initial discharging capacity of 147 mAh/g. In the second cycle, the battery exhibited the charging capacity of 144 mAh/g and the discharging capacity of 138 mAh/g. In all of the cycles thereafter, the battery continued to exhibit stable charging and discharging characteristics.

What is claimed is:

1. A lithium silicate-based compound, comprising: lithium (Li); iron (Fe); silicon (Si); and oxygen (O), and expressed by a composition formula, $Li_{1.5}FeSiO_{4.25}$,
    wherein the lithium silicate-based compound is a monoclinic crystal that belongs to space group $P2_1/n$.

2. The lithium silicate-based compound according to claim 1, wherein
    the iron (Fe) has an electronic state where trivalent iron (Fe) is present by 50% or more.

3. The lithium silicate-based compound according to claim 1, wherein the lithium silicate-based compound has not been subjected to charging.

4. The lithium silicate-based compound according to claim 2, wherein the iron (Fe) has an electronic state where trivalent iron (Fe) is present by 50% or more prior to charging.

5. The lithium silicate-based compound according to claim 2, wherein the iron (Fe) has an electronic state where trivalent iron (Fe) is present by 70% or more prior to charging.

6. A positive electrode active material for lithium ion secondary battery, comprising the lithium silicate-based compound according to claim 1.

7. The positive electrode active material for lithium ion secondary battery according to claim 6, further comprising carbon (C) and lithium carbonate ($Li_2CO_3$).

8. The positive electrode active material for lithium ion secondary battery according to claim 6, wherein
    in the positive electrode active material used as a positive electrode of a lithium ion secondary battery, iron (Fe) present therein is all trivalent prior to charging.

9. The positive electrode active material for lithium ion secondary battery according to claim 8, wherein
    in the positive electrode active material used as a positive electrode of a lithium ion secondary battery, $Fe^{2+}$ and $Fe^{3+}$ are present, and $Fe^{2+}$ is present by 50 to 80% in $^{57}Fe$ Mössbauer spectroscopic analysis after discharging.

10. The positive electrode active material for lithium ion secondary battery according to claim 6, wherein the positive electrode active material has not been subjected to charging.

11. The positive electrode active material for lithium ion secondary battery according to claim 7, wherein the positive electrode active material has not been subjected to charging.

12. The positive electrode active material for lithium ion secondary battery according to claim 6, wherein the iron (Fe) has an electronic state where trivalent iron (Fe) is present by 70% or more prior to charging.

13. The positive electrode active material for lithium ion secondary battery according to claim 6, wherein the iron (Fe) present therein is all trivalent prior to charging.

14. The positive electrode active material for lithium ion secondary battery according to claim 12, further comprising a binder.

15. The positive electrode active material for lithium ion secondary battery according to claim 13, further comprising a binder.

16. A positive electrode for lithium ion secondary battery, comprising the positive electrode active material for lithium ion secondary battery according to claim 6.

17. A lithium ion secondary battery, comprising the positive electrode for lithium ion secondary battery according to claim 16 as a structural element.

18. A vehicle mounted with the lithium ion secondary battery according to claim 17.

* * * * *